N. E. KOCH.
ROLLER BEARING SLEEVE CLAMP.
APPLICATION FILED NOV. 22, 1919.
1,363,795.
Patented Dec. 28, 1920.
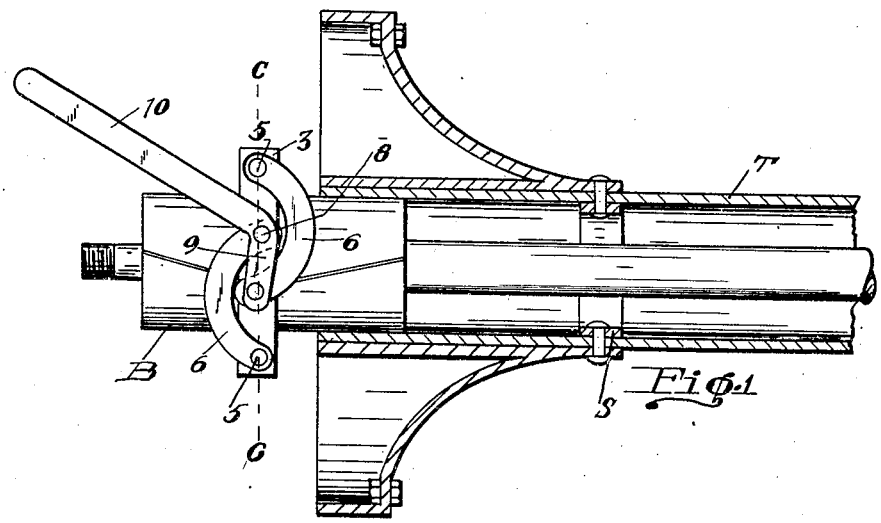
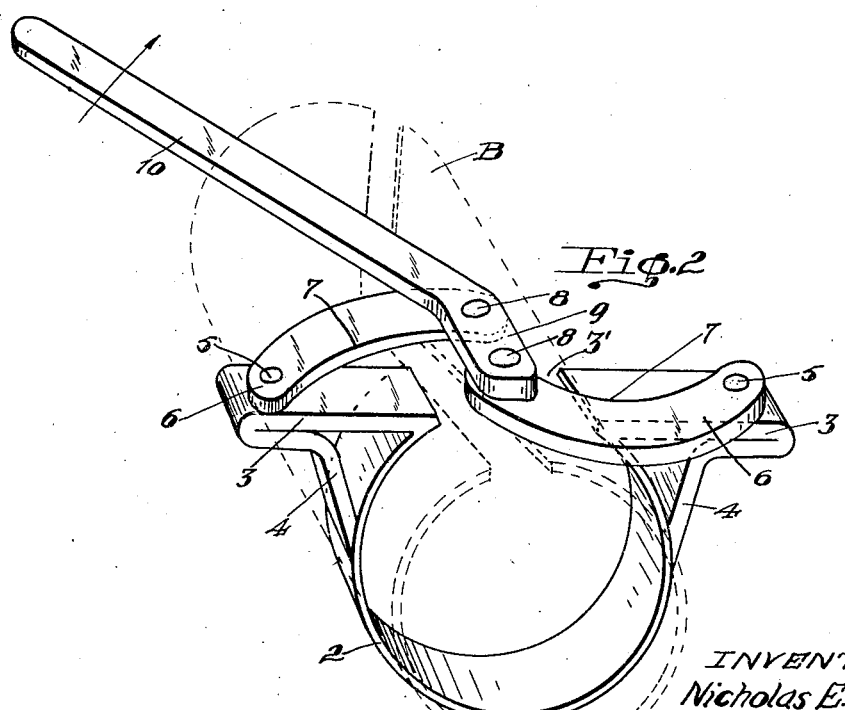
INVENTOR
Nicholas E. Kock
By Hazard & Miller
Att'ys

UNITED STATES PATENT OFFICE.

NICHOLAS E. KOCH, OF LOS ANGELES, CALIFORNIA.

ROLLER-BEARING-SLEEVE CLAMP.

1,363,795.  Specification of Letters Patent.  Patented Dec. 28, 1920.

Application filed November 22, 1919. Serial No. 339,939.

*To all whom it may concern:*

Be it known that I, NICHOLAS E. KOCH, a citizen of the United States, residing at Los Angeles, in the county of Los Angeles and State of California, have invented new and useful Improvements in Roller-Bearing-Sleeve Clamps, of which the following is a specification.

This invention relates to hand tools and particularly has for its object to provide a simple, inexpensive and easily operable tool for the facile gripping and manipulation of round and tubular members, such for instance, as steel roller bearing sleeves that are commonly used in the housings of automobile shafts. The invention consists in the construction and details of such a tool, an embodiment of which is illustrated in the accompanying drawings, and described and claimed herein.

Figure 1 is a central diametrical sectional view of a portion of an axle housing and showing the tool as applied to the use of inserting a bearing sleeve in the housing.

Fig. 2 is a perspective of the tool in open position, a tube or sleeve being shown in dotted lines.

Automobile axle housings are usually provided at each end with a removable steel or other metal roller bearing, indicated at B, in which the bearing consists of a longitudinal split sleeve of resilient character and normally having a diameter greater than the diameter of the housing tube T into which the sleeve B is designed to be inserted, as shown in Fig. 1 to abut against a stop shoulder or ring S.

To provide for the insertion of the bearing sleeve B with facility I have devised a tool comprising a band-like member 2, preferably of resilient material such as steel, this being split or left open at one side as at 3′ to permit the contraction of the band 2 snugly upon the inserted sleeve or bearing B. The free ends of the band 2 are shown as provided with divergent or tangential arms or brackets 3, preferably braced or reinforced as by bars 4. On the outer ends of the brackets 3, which are preferably coplanar in the top surface, are placed pivots 5 on which are mounted the distal or remote ends of links 6—6, the pivots 5—5 of which are disposed on a line substantially perpendicular to the axis of the band 2.

The links 6—6 have a concave inner edge 7, or the whole link may be bodily curved as shown and the proximate ends of the links 6—6 are connected by respective pivots 8 to the short arm 9 of a handle or lever 10. The body of the lever 10 is disposed at a suitable angle with relation to the length of the arm 9 and when the lever 10 is thrown to the position shown in Fig. 2 the short arm 9 extends substantially parallel to the axis of the clamping ring 2 with the result that the links 6—6 are relatively spread apart and the opening 3 of the ring increased or permitted to assume its normal condition. By turning the lever 10 in the direction of the arrow in Fig. 2 the proximate ends of the links are caused to overlap each other, thereby contracting the opening 3 so that the band 2 will close upon the inserted sleeve B and the latter contracted as shown in Fig. 1 so as to be readily inserted into the end of the tube T. Preferably the relation of the pivots 5—5 of the links on the brackets of the link pivots 8—8 on the arm 10 is such that when the arm is thrown to the closing position as in Fig. 1, the pivots 8—8 will cross the center line c—c between the pivots 5—5 so that the toggle mechanism becomes automatically locked when in closed position.

After the sleeve has been inserted into the end of the housing tube T the tool may be released from the bearing B and the latter can be driven home in the usual manner.

Various changes may be made without departing from the spirit of my invention as claimed.

I claim:

1. A sleeve contracting device comprising a split ring, tangential bearings on said ring, and toggle means for contracting the free ends of said ring, said toggle means being operable in a plane parallel to the axis of the ring.

2. A sleeve contracting device comprising a split ring, an actuating lever, tangential bearings on said ring, and toggle means for contracting the free ends of said ring, said toggle means consisting of links pivotally connected at their distal ends to said bearings and at their proximal ends to said actuating lever.

3. A sleeve contracting device comprising a resilient split ring, an actuating lever, tangential coplanar bearings on said ring and toggle means for contracting the free ends of said ring, said toggle means consisting of coplanar links pivotally connected at their distal ends to said bearings and at their proximal ends to said actuating lever, said toggle mechanism being operable in a plane parallel to the axis of said ring.

4. A sleeve contracting device comprising an incomplete band, and toggle means connecting the spaced ends of the band for contracting them upon an inserted compressible sleeve, the ends of the bands having tangential bearings, said means including coplanar links pivoted at distal ends on the bearings.

5. A sleeve contracting device comprising an incomplete band, and toggle means connecting the spaced ends of the band for contracting them upon an inserted compressible sleeve, the ends of the bands having tangential bearings, said means including coplanar links pivoted at distal ends on the bearings, and a lever connecting the proximate ends of the links.

6. A sleeve contracting device comprising an incomplete band, and toggle means connecting the spaced ends of the band for contracting them upon an inserted compressible sleeve, the ends of the bands having tangential bearings, said means including coplanar links pivoted at distal ends on the bearings, and a lever connecting the proximate ends of the links, the links being curved so that the proximate pivots can be passed the center line of the distal pivots.

In testimony whereof I have signed my name to this specification.

NICHOLAS E. KOCH.